(12) United States Patent
Levien et al.

(10) Patent No.: US 8,781,528 B2
(45) Date of Patent: Jul. 15, 2014

(54) AUTOMATIC MOBILE DEVICE BACKUP

(75) Inventors: Royce A. Levien, Lexington, MA (US);
Robert W. Lord, Seattle, WA (US);
Mark A. Malamud, Seattle, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1090 days.

(21) Appl. No.: 12/006,266

(22) Filed: Dec. 31, 2007

(65) Prior Publication Data

US 2009/0170502 A1 Jul. 2, 2009

(51) Int. Cl.
| | |
|---|---|
| *H04M 3/00* | (2006.01) |
| *H04W 24/00* | (2009.01) |
| *H04M 1/00* | (2006.01) |
| *G08B 13/14* | (2006.01) |
| *H04W 4/00* | (2009.01) |
| *H04B 7/216* | (2006.01) |
| *G06F 7/00* | (2006.01) |
| *G06F 17/00* | (2006.01) |
| *G06F 15/16* | (2006.01) |
| *G06F 7/04* | (2006.01) |
| *G06F 17/30* | (2006.01) |
| *H04N 7/16* | (2011.01) |
| *H04W 8/18* | (2009.01) |
| *H04M 1/725* | (2006.01) |

(52) U.S. Cl.
CPC ............ *H04W 8/18* (2013.01); *H04M 1/72525* (2013.01)
USPC ........ 455/558; 455/418; 455/423; 455/550.1; 340/568.1; 370/328; 370/335; 370/338; 707/618; 707/644; 709/201; 709/203; 726/26

(58) Field of Classification Search
CPC ..... H04W 12/12; H04W 12/06; H04W 8/245; H04W 24/00; H04W 80/04; H04W 84/12; H04L 29/08108; H04L 29/08072; H04M 1/72519; H04B 1/3816; H04B 1/707; G08B 13/1427; G06F 17/30578; G06F 11/1451; G06F 21/10
USPC .......... 455/41.2, 90.1, 90.2, 90.3, 343.5, 346, 455/348, 351, 410, 411, 412.1, 414.1, 418, 455/419, 420, 423, 425, 438, 456.4, 517, 455/550.1, 552.1, 564, 574, 575.1, 557, 455/558, 572; 340/5.74, 7.63, 539.11, 340/539.23, 539.1, 539.32, 545.4, 546, 551, 340/552, 561, 562, 563, 568.1, 568.6, 340/568.7, 572.1, 573.1; 379/201.12, 350; 711/162; 714/5, 6, 15

See application file for complete search history.

(56) References Cited

U.S. PATENT DOCUMENTS

| | | | | |
|---|---|---|---|---|
| 5,524,276 | A | * | 6/1996 | Littig et al. .................. 455/418 |
| 5,539,665 | A | * | 7/1996 | Lamming et al. ............. 709/224 |

(Continued)

FOREIGN PATENT DOCUMENTS

| | | |
|---|---|---|
| WO | WO 2006121084 A1 * | 11/2006 |
| WO | WO 2007029912 A1 * | 3/2007 |

*Primary Examiner* — Bobbak Safaipour
*Assistant Examiner* — Paul P Tran (57) ABSTRACT

Embodiments of systems and methods for automatic backup of a user's data stored on a mobile device are disclosed. In one embodiment, a method includes storing a user information from a memory of a mobile communication device into a database; determining a status of the mobile communication device; and when the status indicates that the mobile communication device requires replacement, notifying a user of an availability of the user information from the storage facility for creation of a replacement device.

24 Claims, 5 Drawing Sheets

(56) References Cited

U.S. PATENT DOCUMENTS

| | | | | |
|---|---|---|---|---|
| 5,778,321 | A * | 7/1998 | Jouin et al. | 455/558 |
| 6,064,880 | A * | 5/2000 | Alanara | 455/419 |
| 6,308,061 | B1 * | 10/2001 | Criss et al. | 455/418 |
| 6,351,099 | B2 * | 2/2002 | Jones et al. | 320/132 |
| 6,615,038 | B1 * | 9/2003 | Moles et al. | 455/418 |
| 6,836,212 | B2 * | 12/2004 | Sawinski | 340/539.23 |
| 6,885,861 | B2 * | 4/2005 | Koskelainen | 455/414.2 |
| 6,975,854 | B1 | 12/2005 | Kee | |
| 7,139,555 | B2 | 11/2006 | Apfel | |
| 7,181,229 | B2 | 2/2007 | Singh et al. | |
| 7,200,220 | B1 * | 4/2007 | Yamao | 379/350 |
| 7,447,799 | B2 | 11/2008 | Kushner | |
| 7,729,926 | B1 * | 6/2010 | Hopwood | 705/1.1 |
| 8,521,150 | B2 * | 8/2013 | Sadana et al. | 455/419 |
| 2004/0070499 | A1 | 4/2004 | Sawinski | |
| 2004/0157639 | A1 * | 8/2004 | Morris et al. | 455/550.1 |
| 2005/0136911 | A1 * | 6/2005 | Csapo et al. | 455/423 |
| 2006/0058067 | A1 | 3/2006 | Mansour | |
| 2006/0206544 | A1 | 9/2006 | Oks et al. | |
| 2007/0010986 | A1 | 1/2007 | Hong et al. | |
| 2007/0207729 | A1 * | 9/2007 | Chen et al. | 455/15 |
| 2007/0281664 | A1 * | 12/2007 | Kaneko et al. | 455/410 |
| 2008/0260156 | A1 * | 10/2008 | Baba et al. | 380/277 |
| 2009/0083857 | A1 * | 3/2009 | Ueno et al. | 726/26 |
| 2012/0142310 | A1 * | 6/2012 | Pugh et al. | 455/406 |

* cited by examiner

AUTOMATIC MOBILE DEVICE BACKUP

FIELD OF THE DISCLOSURE

The present disclosure relates generally to mobile devices, and more specifically, to automatic backup of a user's data stored on a mobile device that enables fast and efficient replication of the mobile device.

BACKGROUND

Modern communication devices, particularly mobile communication devices such as cellular telephones, personal data assistants (PDAs), and the like usually become repositories for a variety of different types of information. Such information may include, for example, telephone numbers, addresses, ring tones, access numbers, passwords or access codes, account information, messages, audio, video, and photographic recordings, or any other desired types of information.

While such communication devices are widely recognized for their usefulness, there is room for improvement. For example, when such a mobile communication device is lost, destroyed, or otherwise requires replacement, the information that is often meticulously input or otherwise stored (e.g. downloaded) by the user over the course of a lengthy period of use may be lost with the communication device. When a replacement device is received, the user typically will repeat the lengthy and inconvenient process of storing the information of the lost device on the replacement device. Sometimes, at least portions of the information may be lost to the user forever.

SUMMARY

Embodiments of systems and methods for automatic backup of a user's data stored on a mobile device are disclosed. Embodiments in accordance with the present disclosure may advantageously enable fast and efficient replication of a mobile device if the original mobile device requires replacement, thereby easing the burden normally associated with transitioning to a replacement device, and improving the user's satisfaction with the mobile communication device and associated service.

In one embodiment, a method includes storing a user information from a memory of a mobile communication device into a database, and determining a status of the mobile communication device. When the status indicates that the mobile communication device requires replacement, the method transmits a symbol associated with a notification of a user of an availability of the user information from the storage facility for creation of a replacement device.

In another embodiment, a method includes determining a status of a mobile communication device, based on the status, storing a user information from a memory of the mobile communication device into a storage facility. When the status indicates that the mobile communication device requires replacement, the method includes transmitting a symbol associated with notifying a user of an availability of the user information from the storage facility for creation of a replacement device.

In still another embodiment, a method includes determining that a mobile communication device requires replacement, and transmitting a symbol associated with notifying a user of an availability of a user information from a database for creation of a replacement device.

In a further embodiment, a system includes a storage facility having a database, and a communication component configured to communicate with a mobile communication device, to receive a user information from a memory of the mobile communication device, and to store the user information into the database. A determination component is configured to receive signals from the communication component and determine whether the mobile communication device requires replacement. A notification component communicates with the communication component and the determination component, and is configured to transmit a symbol associated with notifying a user of an availability of the user information within the database for creation of a replacement device when the mobile communication device requires replacement. A network is configured to enable communications between the storage facility and the mobile communication device.

Additional features, aspects and benefits will be understood by those skilled in the art from the following drawings and detailed description for various exemplary and preferred embodiments.

DETAILED DESCRIPTION

Techniques for preserving a user's information stored on a mobile device are disclosed. Many specific details of certain embodiments are set forth in the following description, and in FIGS. 1-5, to provide a thorough understanding of such embodiments. One skilled in the art will understand from the teachings of the present disclosure, however, that the present disclosure may have other possible embodiments, and that such other embodiments may be practiced with/without some of the details set forth in the following description.

Figure 1:
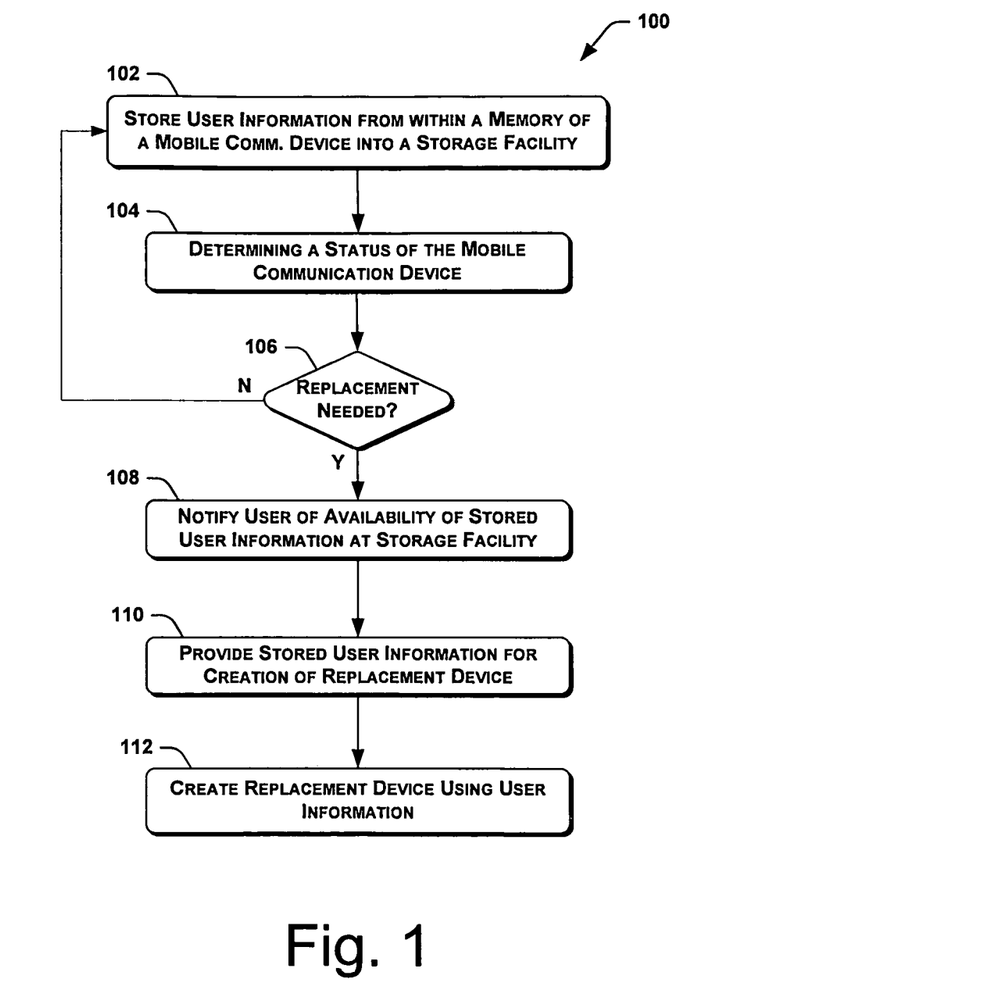
FIG. 1 is a flowchart of a process for preserving user information from a mobile communication device for creating a replacement device in accordance with an embodiment of the present disclosure.

FIG. 1 is a flowchart of a process 100 in accordance with an embodiment of the present disclosure. In this embodiment, the process 100 includes storing user information from a memory of a mobile communication device into a database at 102. At 104, a status of the mobile communication device is determined. At 106, the process 100 determines whether the status indicates that the mobile communication device requires replacement. If not, the process 100 returns to 102 and repeats the actions associated with storing the user information (at 102) and determining the status of the mobile communication device (at 104).

The term "user information" as used herein is intended to refer to any type of information or data that may be stored by a user within a memory associated with the mobile communication device that the user may wish to retrieve in the event that the mobile communication device requires replacement. For example, user information may include telephone numbers, addresses, ring tones, access numbers, passwords or access codes, account information, messages, audio, video, and photographic recordings, or any other desired types of information. In some implementations, the storage may be resident within relative to the mobile communication device;

in some instances, the storage may be non-resident relative to the mobile communication device; in some instances, the storage may be distributed resident and non-resident relative to the mobile communication device.

Similarly, the term "mobile communication device" is intended to include any type of device that a user may use to communicate and store information. For example, exemplary mobile communication devices may include telephones, personal data assistants, or any other devices that communicate via a network (e.g. a WiFi network, a satellite network, etc.)

With continued reference to FIG. 1, when it is determined (at 106) that a replacement device is needed, the process 100 notifies a user (or transmits a symbol associated with notifying a user) of the mobile communication device of an availability of the user information for creation of a replacement device at 108. In some embodiments, the user information is then provided for creation of a replacement device at 110, and a replacement device is created using the user information at 112. Alternately, a symbol may be transmitted at 112 associated with creating the replacement device.

It will be appreciated that a variety of alternate embodiments may be conceived in accordance with the teachings of the present disclosure. For example, in some embodiments, storing user information from a memory of a mobile communication device into a database (at 102) may include automatically backing-up the user information into the database. In particular, the user information may be automatically backed-up into the database periodically, or during a period of reduced usage of the mobile communication device (e.g. such as when the mobile communication device is charging), or when a communication link having a predetermined bandwidth is available (e.g. at night while most users in an area are sleeping), or any combination of these possibilities. Further, the user information may be stored into the database based on a user-initiated request, or when the user information is updated by the user.

Similarly, the status of the mobile communication device (at 104) may be determined in a variety of ways. In some embodiments, for example, determining a status of the mobile communication device may include analyzing a usage history, a location history, a battery level, or any suitable combination of these possibilities. The status determination may also include determining that the mobile communication device is no longer possessed by the user. In further embodiments, the status determination may include receiving a user-initiated indication that the mobile communication device is no longer possessed by the user. In still other embodiments, the determining of the status of the mobile communication device may include prompting the user for an input into the mobile communication device, and determining that the communication device is no longer possessed by the user when the input is not provided.

Furthermore, the determining of the status of the mobile communication device may include determining that a failure of the mobile communication device is relatively near. For example, it may be determined that a power level of a battery of the mobile communication device is reaching a critically weak condition, or that a moisture level, a pressure level, or a temperature level (or any combination thereof) within the mobile communication device is reaching a critically high condition. In still other embodiments, the status determination may include determining a probable cause of the failure. When a failure mode of the mobile communication device is determined, the process may notify the user of the failure mode of the mobile communication device to assist the user, for example, with handling and provisioning the replacement device.

Notifying a user of an availability of the user information (at 108) may include several possible actions. For example, the notification may include mailing a notice to the user, emailing a notice to the user, calling an alternate number designated by the user, notifying a third party designated by the user, or any suitable combinations of these possible actions.

It will be appreciated that, in some embodiments, the storing of the user information may occur multiple times before a replacement device is needed, and that storing the user information may include storing multiple versions of the user information. More specifically, storing a user information from a memory of a mobile communication device into a database may include storing a first version at a first time and storing a second version at a second time. In such embodiments, notifying a user of an availability of the user information may include notifying the user of the availability of the first and second versions.

In additional embodiments, the user may place a request for a replacement device, and the user information may be communicated (or transmitted) from the database to a retail outlet for creation of the replacement device. The replacement device may be created using the user information (or portions thereof) by populating the user information into a memory of the replacement device.

It should be appreciated that the particular embodiments of processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Figure 2:
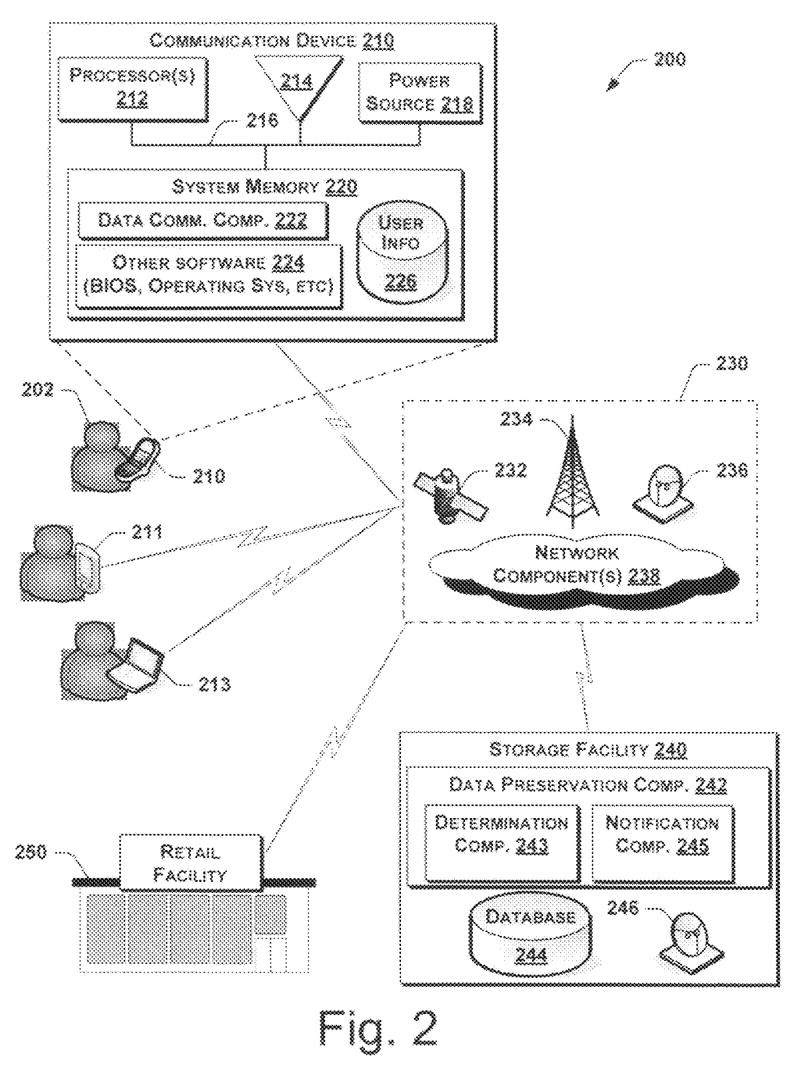
FIG. 2 is a system for preserving user information for creating a replacement device in accordance with an embodiment of the present disclosure.

It will also be appreciated that the processes described herein may be implemented using a variety of different systems. For example, FIG. 2 is a system 200 for preserving user information for creating replacement devices in accordance with another embodiment of the present disclosure. In this embodiment, the system 200 includes a communication device 210 that operatively communicates with a storage facility 240 via a communication network 230. In addition, the storage facility 240 may be in communication with a retail facility 250 using the communication network 230. In some embodiments, the communication device 202 includes a cellular telephone. The system 200 may also include a personal data assistant (PDA) 211, and another device 213 that communicates via a network (e.g. a WiFi network, a satellite network, etc.).

In a particular embodiment, the communication device 210 includes one or more processors 212 and one or more input/output (I/O) devices 214 coupled to a system memory 220 by a bus 216. The I/O device 214 may include, for example, one or more antenna, photo-detectors, photodiodes, transmitters, receivers, transceivers, or any other suitable wireless communication devices. A power source 218 (e.g. a battery) provides power to the various parts of the communication device 210.

The system memory 220 may include computer-readable media configured to store data and/or program modules for implementing the techniques disclosed herein. More specifically, the system memory 220 may include a data communication component 222 and user information 226 input (or otherwise stored) by a user 202 that may be accessed by (and executed on) the processor 212. In the embodiment shown in FIG. 2, the data communication component 222 includes a determination component 221 configured to receive signals and to determine whether the communication device 210 requires replacement. The system memory 220 may also store other software 224 embodying instructions, routines, and methodologies used to carry out the desired functionalities of the communication device 220, such as, for example, a basic input/output system (BIOS), an operating system, one or more application programs, or any other suitable information.

It will be appreciated that the system memory 220 may include any available computer-readable media that may be accessed by the processor 212, including computer storage media and communication media. Computer storage media may include volatile and nonvolatile, and removable and non-removable media, implemented in any method or technology for storage of information such as computer-readable instructions, data structures, program modules, or other data. Suitable computer storage media includes, but is not limited to, and random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information.

Similarly, communication media typically embodies computer-readable instructions, data structures, program modules or other data in a modulated data signal, such as a carrier wave or other transport mechanism, and includes any information delivery media. The term "modulated data signal" can include but is not limited to a signal that has one or more of its characteristics set or changed in such a manner as to encode information in the signal. By way of example, and not limitation, suitable communication media includes wired media, such as a wired network or direct-wired connection, and/or other suitable media recognized by those of skill in the art. Combinations of any of the above are also included within the scope of computer readable media.

Generally, program modules executed on the communication device 210 (FIG. 2) may include routines, programs, objects, components, data structures, etc., for performing particular tasks or implementing particular abstract data types. These program modules and the like may be executed as native code, or may be downloaded and executed such as in a virtual machine or other just-in-time compilation execution environments. Typically, the functionality of the program modules may be combined or distributed as desired in various implementations.

With continued reference to FIG. 2, the communication network 230 may include a variety of suitable communication components operatively coupled to provide the desired communication functionality. Various exemplary communication components of the communication network 230 are shown in FIG. 2 for illustrative purposes. For example, in some implementations, the communication network 230 may include one or more of the following: a communications satellite 222, an antenna tower 224, a communications dish 226, and one or more network components 238.

Similarly, the storage facility 240 includes a variety of suitable communication components operatively coupled to provide the desired communication functionality. For example, in the implementation shown in FIG. 2, the storage facility 240 includes a data preservation component 242 operatively coupled to a database 244 and a communications link 246. The data preservation component 242 is configured to perform one or more of the functions and operations in accordance with the various methods and processes in accordance with the teachings of the present disclosure. For example, as shown in FIG. 2, the data preservation component 242 may include a determination component 243 configured to receive signals from the communications link 246 and determine whether the communication device 210 requires replacement. The data preservation component 242 may also include a notification component 245 configured to communicate with the communications link 246 and the determination component 243, and to notify a user (or transmit a symbol associated with notifying a user) of an availability of the user information 226 within the database 244 for creation of a replacement device when the mobile communication device 210 requires replacement.

The retail facility 250 includes a variety of known components configured to cooperatively perform the functionality described herein. More specifically, the retail facility 250 is configured to receive the user information from the storage facility 240, and to use the user information to create the replacement device.

Figure 3:
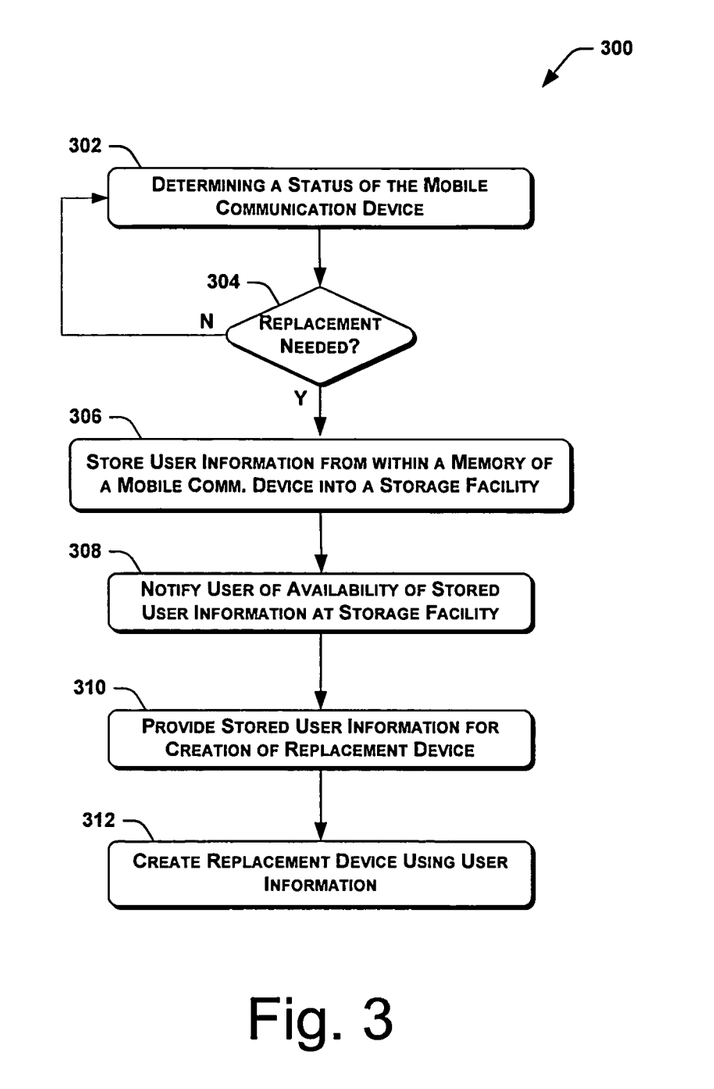
FIGS. 3-5 are flowcharts of processes for preserving user information from mobile communication devices for creating replacement devices in accordance with additional embodiments of the present disclosure.

FIG. 3 is a flowchart of a process 300 for preserving user information from a mobile communication device in accordance with an additional embodiment of the present disclosure. In this embodiment, the process 300 includes determining a status of a mobile communication device at 302. At 304, the process 300 determines whether the status indicates that the mobile communication device requires replacement. If not, the process 300 returns to 302 and repeats the actions associated with determining the status of the mobile communication device (at 302).

When it is determined (at 304) that a replacement device is needed, the process 300 stores a user information from a memory of a mobile communication device into a database at 306, and at 308, the process 300 notifies a user of an availability of the user information for creation of a replacement device. In some embodiments, the user information is then provided for creation of a replacement device at 310, and a replacement device is created using the user information at 312.

Figure 4:
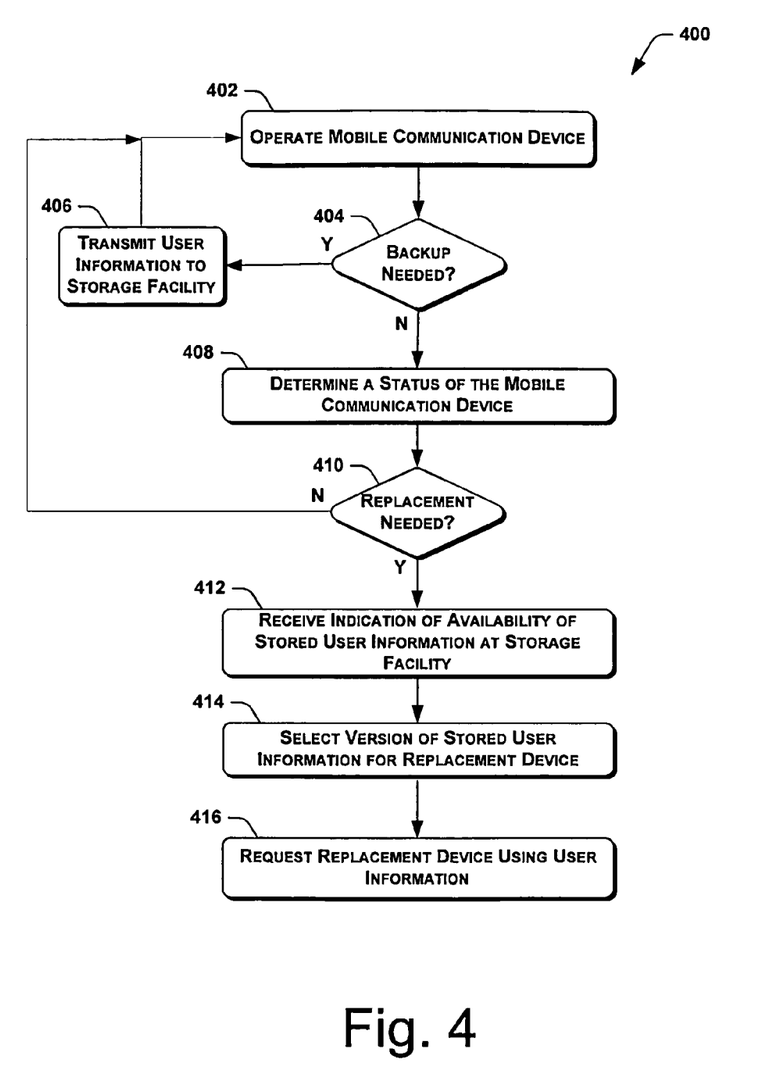

Another implementation of a process 400 for preserving user information from a mobile communication device is shown in FIG. 4. In this embodiment, the process 400 includes operating a mobile communication device at 402. At 404, the process 400 determines whether the user information needs to be stored (or backed up). If so, the process 400 communicates the user information to a database (e.g. at a storage facility) at 406, and returns to 402 to repeat the activities associated with operating the device (at 402) and determining whether user information storage is needed (at 404).

As further shown in FIG. 4, when storage is not needed (at 404), the process 400 determines a status of the mobile communication device at 408, and determines whether replacement of the mobile communication device is needed at 410. If not, the process 400 returns to 402 and repeats the actions associated with 402 through 410.

When the process 400 determines that replacement of the communication device is needed (at 410), then an indication of the availability of the user information at the storage facility is received by the user at 412. At 414, an available version of the stored user information is selected by the user, and a request for the replacement device populated using the user information is tendered at 416.

Figure 5:
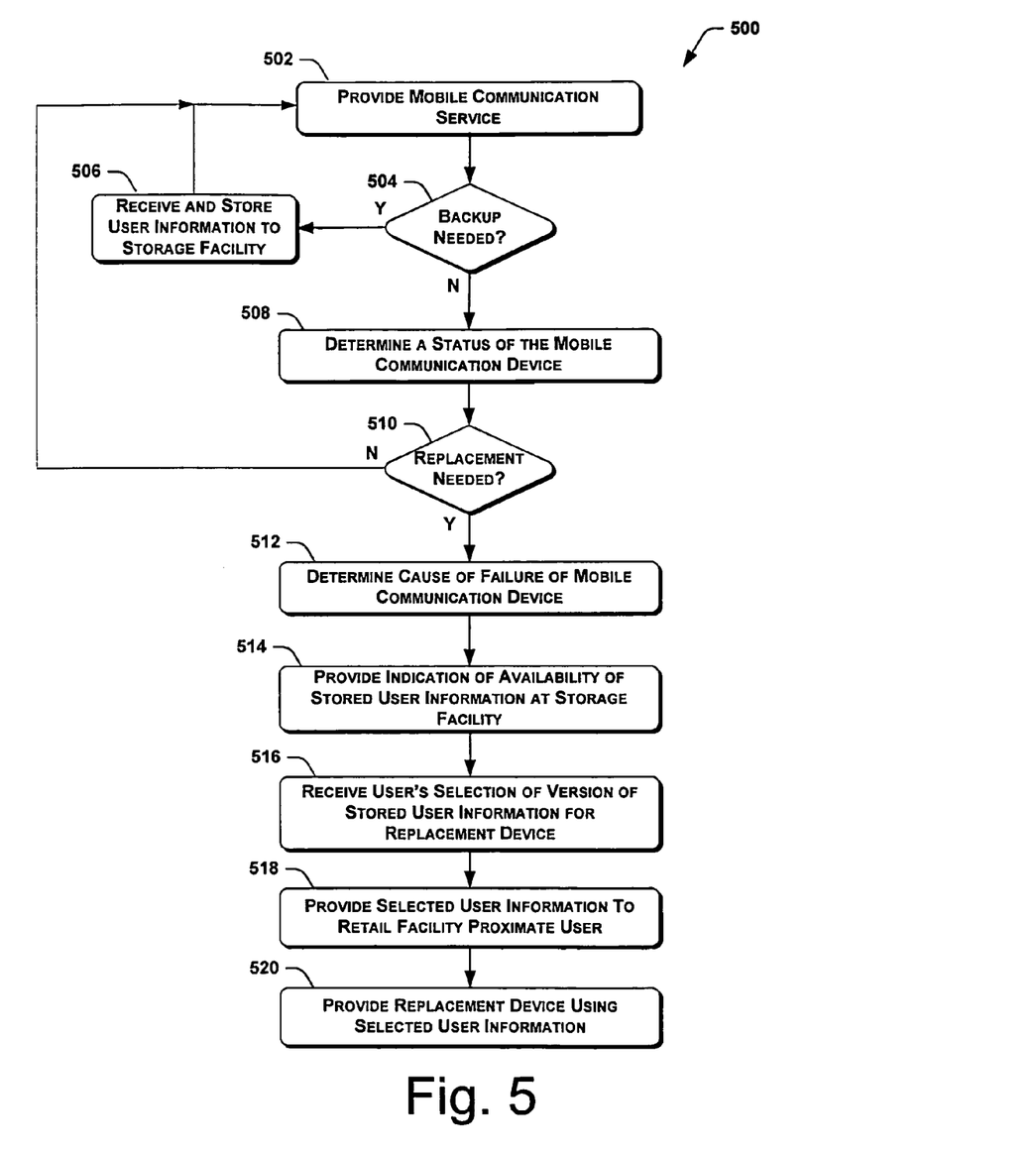

FIG. 5 is a process 500 for preserving user information from a mobile communication device in accordance with still another embodiment of the present disclosure. In this embodiment, the process 500 includes providing a mobile communication service at 502, and determining whether the user information needs to be stored (or backed up) at 504. If so, the process 500 receives and stores the user information to a database (e.g. at a storage facility)at 506, and returns to 502 to repeat the activities associated with providing the service (at 502) and determining whether user information storage is needed (at 504).

As further shown in FIG. 5, when storage is not needed (at 504), the process 500 determines a status of the mobile communication device at 508, and determines whether replacement of the mobile communication device is needed at 510. If not, the process 500 returns to 502 and repeats the actions associated with 502 through 510.

When the process 500 determines that replacement of the communication device is needed (at 510), then the process 500 determines a probable cause of a failure of the mobile communication device at 512. At 514, the process 500 provides an indication of the availability of the user information stored in the database. At 516, a user's selection of an available version of the stored user information is received from the user, and at 518, the selected user information is provided to a retail facility proximate to the user. At 520, a replacement device is provided using the selected user information.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/ or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A method, comprising:
providing a mobile communication service, including at least providing a storage facility, the storage facility wirelessly coupled with one or more mobile communication devices via the mobile communication service;
storing, by a data preservation component of the storage facility, at least a first version at a first time and a second version at a second time of a user-provided information from a memory of a mobile communication device into a database, the user-provided information being at least one of input by a user of the mobile communication device or obtained by the user while using the mobile communication device, the user-provided information periodically received from the mobile communication device by the storage facility via the mobile communication service;
determining, by a determination component of the storage facility, a status of the mobile communication device;
when the status indicates that the mobile communication device requires replacement, transmitting, by a notification component of the storage facility, a symbol associated with notifying a user of an availability of at least the first and second versions of the user-provided information from the database for creation of a replacement device;
receiving, by the storage facility, a request from the user for a replacement device, the request from the user for a replacement device including at least a selection of the user of at least one of the first or second versions of the user-provided information from the database; and
responsive to the request, transmitting, by the storage facility, a symbol associated with creating a replacement device, including at least providing access to the requested at least one of the first or second versions of the user-provided information capable of populating the replacement device from the database.

2. The method of claim 1, wherein storing, by a data preservation component of the storage facility, at least a first version at a first time and a second version at a second time of a user-provided information from a memory of a mobile communication device into a database, the user-provided information being at least one of input by a user of the mobile communication device or obtained by the user while using the mobile communication device, the user-provided information periodically received from the mobile communication device by the storage facility via the mobile communication service comprises:
automatically backing-up the user-provided information into the database.

3. The method of claim 2, wherein automatically backing-up the user-provided information into the database comprises:

automatically backing-up the user-provided information at least one of; and during a period of reduced usage of the mobile communication device or during a period when a communication link having a predetermined bandwidth is available.

4. The method of claim 1, wherein determining, by a determination component of the storage facility, a status of the mobile communication device comprises:
analyzing at least one of a usage history, a location history, or a battery level to determine whether the mobile communication device requires replacement.

5. The method of claim 1, wherein determining, by a determination component of the storage facility, a status of the mobile communication device comprises:
determining that the mobile communication device is no longer possessed by the user.

6. The method of claim 1, wherein determining, by a determination component of the storage facility, a status of the mobile communication device comprises:
receiving a user-initiated indication that the mobile communication device is no longer possessed by the user.

7. The method of claim 1, wherein determining, by a determination component of the storage facility, a status of the mobile communication device comprises:
prompting the user for an input into the mobile communication device; and
determining that the communication device is no longer possessed by the user if the input is not provided.

8. The method of claim 1, wherein determining, by a determination component of the storage facility, a status of the mobile communication device comprises:
determining that a failure of the mobile communication device is relatively near.

9. The method of claim 8, wherein determining that a failure of the mobile communication device is relatively near comprises:
determining a probable cause of the failure.

10. The method of claim 1, wherein determining, by a determination component of the storage facility, a status of the mobile communication device comprises:
determining a failure mode of the mobile communication device; and
wherein notifying a user of an availability of the user-provided information comprises:
notifying the user of the failure mode of the mobile communication device.

11. The method of claim 1, wherein transmitting, by a notification component of the storage facility, a symbol associated with notifying a user of an availability of at least the first and second versions of the user-provided information from the database for creation of a replacement device comprises:
at least one of mailing a notice to the user, emailing a notice to the user, calling an alternate number designated by the user, or transmitting a symbol associated with notifying a third party designated by the user.

12. The method of claim 1, wherein determining, by a determination component of the storage facility, a status of the mobile communication device comprises:
determining a failure mode of the mobile communication device.

13. The method of claim 12, wherein transmitting, by a notification component of the storage facility, a symbol associated with notifying a user of an availability of at least the first and second versions of the user-provided information from the database for creation of a replacement device comprises:
transmitting a symbol associated with notifying a user of the failure mode of the mobile communication device, the symbol enabling a user to determine at least one of handling or provisioning of a replacement device.

14. The method of claim 1, further comprising:
transmitting the requested at least one of the first or second versions of the user-provided information to a retail outlet for creation of the replacement device.

15. The method of claim 1, further comprising:
transmitting a symbol associated with an entity creating the replacement device using the requested at least one of the first or second versions of the user-provided information.

16. The method of claim 1, wherein the user-provided information includes at least one of a telephone number, an address, an email address, a ring tone, an access number, a password, an access code, an account information, a message, an audio recording, a video recording, a photographic recording, or a user-desired information stored within the memory.

17. The method of claim 1, wherein the mobile communication device includes at least one of a cellular telephone or a personal data assistant.

18. The method of claim 1, wherein the mobile communication device includes at least a cellular telephone device, and wherein the mobile communication service includes at least a cellular telephone communication network.

19. The method of claim 1, wherein the mobile communication device includes at least a wireless communication network device, and wherein the mobile communication service includes at least a wireless communication network.

20. The method of claim 1, wherein transmitting, by a notification component of the storage facility, a symbol associated with notifying a user of an availability of at least the first and second versions of the user-provided information from the database for creation of a replacement device comprises:
transmitting a symbol associated with notifying the user of the availability of the user-provided information for a specified fee.

21. The method of claim 1, wherein determining, by a determination component of the storage facility, a status of the mobile communication device comprises:
initiating a phone call to an alternate number designated by a user of the mobile communication device;
prompting the user for an input; and
determining, responsive to the input, that the mobile communication device requires replacement.

22. The method of claim 1, wherein determining, by a determination component of the storage facility, a status of the mobile communication device comprises:
analyzing, by the determination component of the storage facility, a usage history of the mobile communication device to determine whether the mobile communication device is no longer possessed by the user.

23. A system, comprising:
circuitry configured for providing a mobile communication service, including at least circuitry configured for providing a storage facility, the storage facility wirelessly coupled with one or more mobile communication devices via the mobile communication service;
circuitry configured for storing, by a data preservation component of the storage facility, at least a first version at a first time and a second version at a second time of a user-provided information from a memory of a mobile communication device into a database, the user-provided information being at least one of input by a user of the mobile communication device or obtained by the user while using the mobile communication device, the user-provided information periodically received from the mobile communication device by the storage facility via the mobile communication service;

circuitry configured for determining, by a determination component of the storage facility, a status of the mobile communication device;

circuitry configured for, when the status indicates that the mobile communication device requires replacement, transmitting, by a notification component of the storage facility, a symbol associated with notifying a user of an availability of at least the first and second versions of the user-provided information from the database for creation of a replacement device;

circuitry configured for receiving, by the storage facility, a request from the user for a replacement device, the request from the user for a replacement device including at least a selection of the user of at least one of the first or second versions of the user-provided information from the database; and circuitry configured for, responsive to the request, transmitting, by the storage facility, a symbol associated with creating a replacement device, including at least providing access to the requested at least one of the first or second versions of the user-provided information capable of populating the replacement device from the database.

24. A system, comprising:

a mobile communication service; and a storage facility wirelessly coupled with one or more mobile communication devices via the mobile communication service, the storage facility including at least:

at least one processing device; and one or more instructions that, when executed on the at least one processing device, cause the at least one processing device to at least:

store, by a data preservation component of the storage facility, at least a first version at a first time and a second version at a second time of a user-provided information from a memory of a mobile communication device into a database, the user-provided information being at least one of input by a user of the mobile communication device or obtained by the user while using the mobile communication device, the user-provided information periodically received from the mobile communication device by the storage facility via the mobile communication service;

determine, by a determination component of the storage facility, a status of the mobile communication device;

when the status indicates that the mobile communication device requires replacement, transmit, by a notification component of the storage facility, a symbol associated with notifying a user of an availability of at least the first and second versions of the user-provided information from the database for creation of a replacement device;

receive, by the storage facility, a request from the user for a replacement device, the request from the user for a replacement device including at least a selection of the user of at least one of the first or second versions of the user-provided information from the database; and responsive to the request, transmit, by the storage facility, a symbol associated with creating a replacement device, including at least providing access to the requested at least one of the first or second versions of the user-provided information capable of populating the replacement device from the database.

\* \* \* \* \*

UNITED STATES PATENT AND TRADEMARK OFFICE
CERTIFICATE OF CORRECTION

PATENT NO. : 8,781,528 B2  
APPLICATION NO. : 12/006266  
DATED : July 15, 2014  
INVENTOR(S) : Levien et al.

Page 1 of 1

It is certified that error appears in the above-identified patent and that said Letters Patent is hereby corrected as shown below:

IN THE CLAIMS:

In Column 11, Line 2, Claim 3 please delete text "least one of; and during a period of reduced usage of the" and replace with --least one of (i) during a period of reduced usage of the--

In Column 11, Line 3, Claim 3 please delete text "mobile communication device or during a period when a" and replace with --mobile communication device or (ii) during a period when a--

Signed and Sealed this  
Thirteenth Day of January, 2015

Michelle K. Lee  
*Deputy Director of the United States Patent and Trademark Office*